Patented Aug. 26, 1952

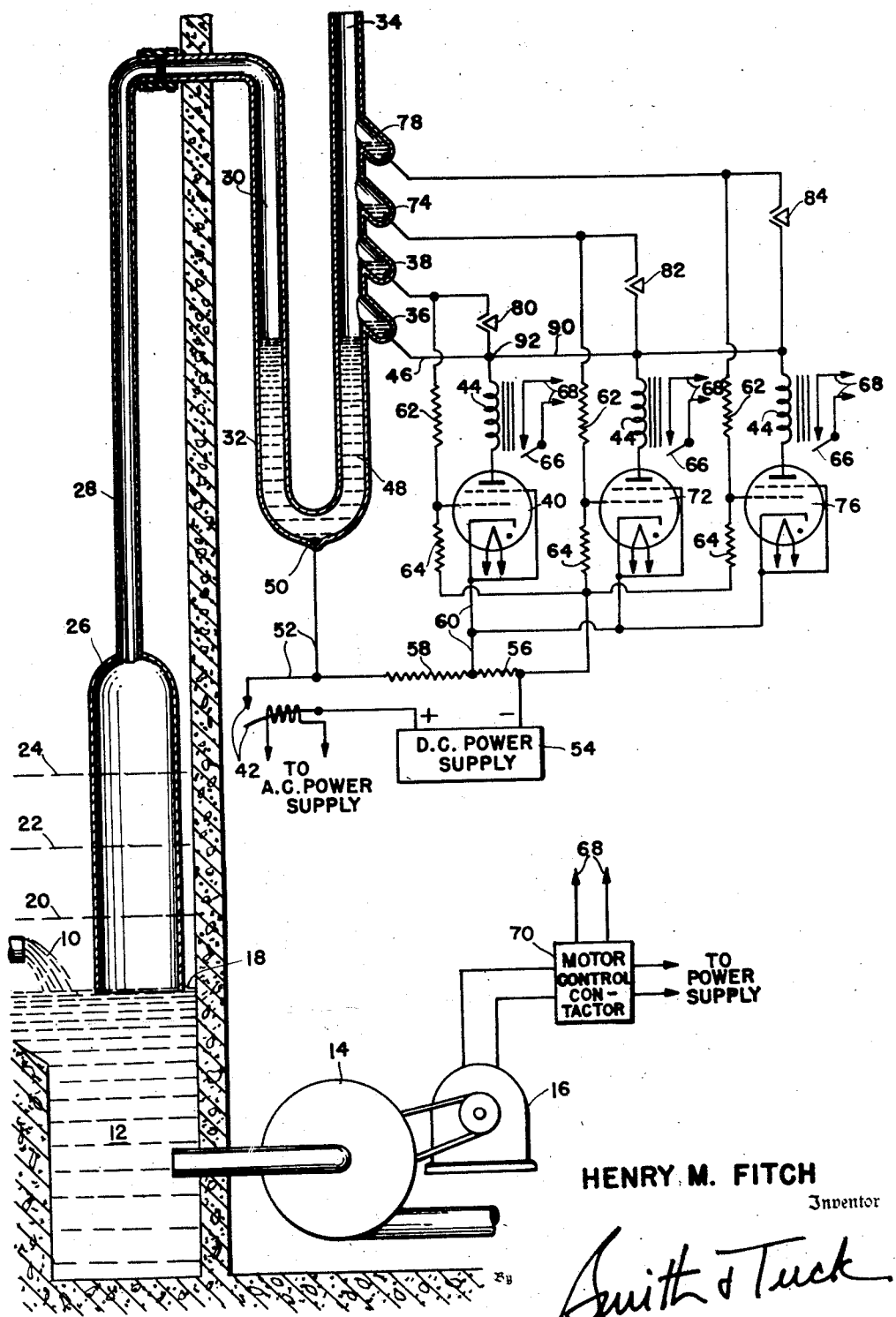

2,608,609

UNITED STATES PATENT OFFICE 2,608,609

LIQUID LEVEL CONTROL EQUIPMENT

Henry M. Fitch, Seattle, Wash.

Application May 2, 1947, Serial No. 745,677

5 Claims. (Cl. 175—320)

This invention relates to liquid level control equipment in a pumping system or wherever the transfer of liquid is necessary to maintain the level of such liquid within prescribed limits.

Numerous methods have been devised to control pumping means by variations in liquid level. However, in this particular instance (sewage pump control) because of debris, grease, rags, etc., mechanical means such as float operated switches were unsatisfactory due to damage by floating material and fouling by rags, string, and the like. Furthermore, it is impractical to transmit mechanical motion, originating in small floating means, to any remote point. Electrodes contacting the sewage liquid directly would soon become fouled and be unreliable. Frequent inspection and maintenance is of paramount importance in such systems, hence they are costly in upkeep. Photo-electric methods would also be in the same category.

It is therefore an object of this invention to provide means for controlling electrical pumping equipment, which cannot become fouled by foreign matter in the liquid to be pumped.

A further object of this invention is to provide liquid level control means pneumatically or hydraulically responsive to changes in the liquid level.

A further object of this invention is to provide a method of electric pump control wherein variations in the level of the liquid to be pumped are transmitted either pneumatically or hydraulically to remote control means.

A further object of this invention is to provide information, at a remote point, on the relative position of the level of the liquid to be pumped.

A further object of this invention is to provide liquid level control means allowing an appreciable change in liquid level to occur before energizing or de-energizing the pumping means.

A further object of this invention is to provide means whereby additional pumping equipment may be put into service as the load increases.

Other objects, applications, and variations of the basic concept herein disclosed will become apparent to those conversant with this art upon study of the following specification in conjunction with the schematic diagram which delineates a preferred embodiment of my invention.

Referring to the figure in the drawing, water or other liquid at 10 pours into the sump 12 to be pumped therefrom later by pump 14, which is driven by motor 16. To avoid having the motor go through many short cycles of pumping and shutting down per day, it is preferable to allow an appreciable rise in water level such as from 18 to 20 before starting to pump. Furthermore, after starting, draw-down should continue to approximately level 18. If the quantity at 10 becomes excessive, and the level continues to rise above 20 after the first pump is started, a second pump may be started when the liquid level reaches 22, and a third pump started if the level reaches 24. In the reverse order, the third pump which started at level 24 would continue to draw-down to level 22 and then be stopped; the second pump starting at level 22 would draw-down to level 20 before shutting down, and similar functioning of the first pump from level 20 to 18 has been described above. To accomplish such control of pumping equipment, air is compressed in the air-bell 26, and the air pressure is transferred through tube 28 to the enclosed region 30 above the pool of mercury in the reservoir 32. As the liquid rises from 18 to 20, the hydrostatic pressure is transferred to the mercury and it rises in the multiple contactor tube 34 to first make electrical contact at 36, and later at 38. Upon making contact at 36, the mercury has completed the external plate-to-cathode circuit of the electron discharge device 40, assuming that the thermal time-delay protector contacts 42 are closed. This plate-to-cathode circuit comprises the plate of tube 40, the relay coil 44, connecting lead 46, mercury contact 36, the mercury column 48, the common mercury connection 50, the connecting lead 52, protector contacts 42, the direct current power supply 54, a resistor 56, and the connecting lead 60 to the cathode element of tube 40. Although the external plate-to-cathode circuit is now complete for tube 40, no plate current flows because tube 40 is a thyratron type of electron discharge device, and the positive plate voltage and negative grid bias have been so selected by means of the voltage divider resistors 56—58 that the tube remains blocked, hence the gas therein is un-ionized or non-conducting. When the mercury 48 in the contactor tube 34 eventually reaches and completes contact at 38, the control grid of tube 40 is connected to the positive terminal of the direct current power supply through resistor 62. Previously, the control grid was connected through resistor 64 to the negative terminal of the direct current power supply, but upon completion of contact at 38, the grid bias is altered or even reversed in sign so that ionization immediately occurs—thus completing the plate-to-cathode circuit within the tube 40. As a result of plate current through tube 40, relay 44 is actuated, closing contacts 66 thereby completing the circuit of leads 68 associated with the motor control contactor 70, thus starting motor 16, to drive pump 14. Resistors 62 and 64 are so selected in value that the grid bias will be altered by the required amount without excessive grid current in tube 40.

Since tube 40 is a thyratron, the grid has no control, once the plate current is established. Therefore, as the pump 14 lowers the water level from 20 to 18, the breaking of the contact at 38 will have no effect on tube 40—hence, relay contacts 66 will remain closed and pump 14 will continue to lower the water level toward 18. As the liquid level is lowered, so also is the mercury 48 lowered in the contactor tube 34 until the connection at 36 is broken—thus opening the plate circuit of tube 40, de-energizing relay 44 and opening its contacts 66, thereby stopping the motor 16 and pump 14. Once the plate circuit has been opened, the mercury 48 must again rise to contact 38 before the pump can function.

Contact 36 is also the plate circuit supply for thyratrons 72 and 76, however, to fire thyratron 72, the mercury 48 must rise to contact 74 as a result of a rise of liquid from 20 to 22. Likewise, to fire thyratron 76, mercury 48 must rise to contact 78 as a result of liquid rise to 24. The above procedure puts all three pumps in service and they will remain in service, because of lack of grid control in the thyratrons, until the draw-down allows the mercury 48 to break contact 36, thereby shutting down all pumps.

The direct current power supply 54 may, of course, be any convenient source of appropriate voltage such as a small motor generator, batteries, or rectified alternating current. The thermal delay protector 42 is intended to prevent application of plate voltage to the thyratrons 40, 72, and 76, until the cathodes have been sufficiently heated, at which time the contacts of protector 42 will close, thus applying the positive voltage to the voltage divider 58 and 56, and also to contact 50 in the mercury 48. If cold cathode thyratrons of appropriate characteristics were substituted for tubes 40, 72, and 76, the protector 42 could be omitted from the circuit. The pushbuttons 80, 82 and 84 are for testing the circuits, or for manual starting of the pump motors provided the mercury 48 has risen high enough in tube 34 to close the plate supply contact 36. After thus starting the pump motors manually, they will continue their draw-down until contact 36 opens.

An alternate possibility of control would be to connect the fluid pressure tube 28 to the open end of the contactor tube 34, instead of as shown, thereby depressing the mercury 48 in the contactor tube 34 as the liquid compressed the air in the air-bell 26. It would then be necessary to reverse the action of the relays actuated by the thyratrons so that when a relay coil such as 44 was de-energized, the contacts 66 would be closed—thus actuating the pump. In some installations this might be a desirable safety feature wherein it would be preferred that a pump run without liquid or load rather than failing to start because of the failure of a thyratron tube or its power supply 54.

In cases where the thyratrons were of such a size that their plate current results in intolerable arcing at the contact 36, a considerably smaller thyratron or even a vacuum triode could be used as tube 40 in the diagram and controlled as shown. The plate current of this smaller tube would then be used to actuate relay means, such as indicated at 44, to make and break the plate circuit of the larger thyratrons by means of the contacts 66 instead of the contacts at 36. In such an arrangement, the thyratrons would still have their grids connected as shown and therefore the grid control would be as described above. The only difference would be a slight change in the plate supply circuits for the tubes 72 and 76. The lead 90 would be disconnected at 92 and connected to one of the contact leads 68, the other one of the contact leads 68 would be connected directly to the positive terminal of the power supply. Tube 72 would then control the first pump of a series, tube 76 the second pump, and so forth.

Obviously this system of control may be applied to any number of stages and is not limited to its application in three stages as shown here. In addition, to those versed in this art, it will be immediately apparent that with minor modifications, this same equipment could be used to maintain a desired water or other liquid level in a reservoir, instead of removing it as in the embodiment described above without departing from the basic concept involved herein. For example, such functioning could be obtained by connecting the air pressure tube 28 to the open end of contactor tube 34, instead of the connection shown in the diagram. In addition, the mercury level would have to be adjusted appropriately. Furthermore, it is not intended that the scope of the invention be limited to the example shown in the sketch. For example, other methods are well known for closing electric circuits by air or fluid pressure. Likewise, a collapsible air-tight bag immersed in the liquid or a cylinder with a piston actuated by a float could conceivably replace the air-bell in a system where the liquid contained nothing to foul such equipment. Therefore, I desire that the scope of this invention be limited only by the dictates of the prior art and the appended claims.

*Installation*

In an actual installation and application of the basic idea disclosed herein, the liquid level control is used to control sewage pumps at a sewage disposal plant. It was the necessity for equipment which could not be fouled by string, rags, grease, and other debris that resulted in this invention. Although dimensions are no part of this invention, it may be of interest that, in the present installation, the air-bell is a six-inch pipe about 12 feet long, and is connected to the mercury contactor tube by a ¼ inch copper tube. The contactor tube is glass with tungsten contacts, and is ¼ inch inside diameter. A 12-foot rise of water outside the air-bell causes about a 2¼-foot rise inside said air-bell, and about a 2½-inch rise in the mercury column.

Having thus described my invention, I claim:
1. An electrical control relay system for controlling flow of current from a power supply to a plurality of operating means, including a first operating means and a second operating means, in response to changes in position of a column of mercury in a pressure controlled mercury tube, comprising: one end of said mercury column being movable reciprocally along a path of travel in said tube, in response to pressure applied to said column, from a first position at which point the relay system is inoperative to operating positions at which points the relay system is activated; a plurality of electrical connections including first, second, third and fourth elec- trical connections disposed along said path of travel of said end of the mercury column, said first connection being in contact with said column at said first position; said second, third and fourth connections being disposed along said path of travel in that order in spaced apart relationship from said first position and from each other and being positioned to contact said end of said column as it passes along said path past the connections; a direct current power source having a positive and a negative pole; electron valve means including a first and a second grid controlled, gas filled electron valve, each having a plate, a cathode and a grid therebetween; a first line connecting said second connection and said plate of said first electron valve; a second line connecting said second connection and said plate of said second electron valve; said cathodes being connected to said negative pole; said grids being connected to said negative pole and current limiting means interposed between each grid and said negative pole; said grid of said first electron valve being connected to said third connection; said grid of said second electron valve being connected to said fourth connection; said first connection being connected to said positive pole; and relay means including first and second relay means; said first relay means being disposed in said first line and being operative to connect said first operating means to said power supply when current passes through said first line; said second relay means being disposed in said second line and being operative to connect said second operating means to said power supply when current passes through said second line; whereby said first operating means is activated when said mercury column contacts said third connection and said second operating means is activated when said mercury column contacts said fourth connection and said first and second operating means remain in operation until said mercury column withdraws past said second connection.

2. The subject matter of claim 1 in which there is a voltage divider resistor interposed between said cathodes and said negative pole having a by-pass line leading to said positive pole and providing means for adjusting the voltage to said cathodes and said mercury tube is an open ended manometer and said fourth, third, second and first connections being disposed below said open end of said tube arranged in that order from said open end.

3. An electrical control relay system for controlling flow of current from a power supply to operating means in response to changes in position of a column of mercury in a pressure controlled mercury tube, comprising: one end of said mercury column being movable reciprocally along a path of travel in said tube, in response to pressure applied to said column, from a first position at which point the relay system is inoperative to an operating position at which point the relay system is activated; first, second and third electrical connections disposed along said path of travel of said end of the mercury column, said first connection being in contact with said column at said first position; said second and third connections being disposed along said path of travel in that order in spaced apart relationship from said first position and from each other and being positioned to contact said end of said column as it passes along said path past the connections; a direct current power source having a positive and a negative pole; a grid controlled, gas filled electron valve having a plate, a cathode and a grid therebetween; a first line connecting said second connection and said plate; said cathode being connected to said negative pole; said grid being connected to said negative pole and current limiting means interposed between said grid and said negative pole; said grid being connected to said third connection; said first connection being connected to said positive pole; and relay means disposed in said first line and being operative to connect said operating means to said power supply when current passes through said first line; whereby said operating means is activated when said mercury column contacts said third connection and said operating means remains in operation until said mercury column withdraws past said second connection.

4. An electrical control relay system for controlling flow of current from a power supply to a plurality of operating means, including a first operating means and a second operating means, in response to changes in position of a column of mercury in a pressure controlled mercury tube, comprising: one end of said mercury column being movable reciprocally along a path of travel in said tube, in response to pressure applied to said column, from a first position to various positions along said path; a plurality of electrical connections including first, second, third and fourth electrical connections disposed along said path of travel of said end of the mercury column, said first connection being in contact with said column at said first position; said second, third and fourth connections being disposed along said path of travel in that order in spaced apart relationship from said first position and from each other and being positioned to contact said end of said column as it passes along said path past the connections; a direct current power source having a positive and a negative pole; electron valve means including a first and a second grid controlled electron valve, each having a plate, a cathode and a grid therebetween; a first line connecting said second connection and said plate of said first electron valve; a second line connecting said second connection and said plate of said second electron valve; said cathodes being connected to said negative pole; said grids being connected to said negative pole and current limiting means interposed between each grid and said negative pole; said grid of said first electron valve being connected to said third connection; said grid of said second electron valve being connected to said fourth connection; said first connection being connected to said positive pole; and relay means including first and second relay means; said first relay means being disposed in said first line and being operative to connect said first operating means to said power supply when current passes through said first line; said second relay means being disposed in said second line and being operative to connect said second operating means to said power supply when current passes through said second line; whereby said first relay means is operated when said mercury column is in contact with said third connection and said second relay means is operated when said mercury column is in contact with said fourth connection.

5. An electrical control relay system for controlling flow of current from a power supply to operating means in response to changes in position of a column of mercury in a pressure controlled mercury tube, comprising: one end of said mercury column being movable reciprocally along a path of travel in said tube, in response to pressure applied to said column, from a first position to various positions along said path; first, second and third electrical connections disposed along said path of travel of said end of the mercury column, said first connection being in contact with said column at said first position; said second and third connections being disposed along said path of travel in that order in spaced apart relationship from said first position and from each other and being positioned to contact said end of said column as it passes along said path past the connections; a direct current power source having a positive and a negative pole; a grid controlled electron valve having a plate, a cathode and a grid therebetween; a first line connecting said second connection and said plate; said cathode being connected to said negative pole; said grid being connected to said negative pole and current limiting means interposed between said grid and said negative pole; said grid being connected to said third connection; said first connection being connected to said positive pole; and relay means disposed in said first line and being operative to connect said operating means to said power supply when current passes through said first line; whereby said first relay means is operated when said mercury column is in contact with said third connection.

HENRY M. FITCH.

REFERENCES CITED

The following references are of record in the file of this patent:

UNITED STATES PATENTS

| Number | Name | Date |
| --- | --- | --- |
| 1,698,692 | Durdin, Jr. | Jan. 8, 1929 |
| 1,942,241 | Duhme | Jan. 2, 1934 |
| 1,972,812 | Wolley | Sept. 4, 1934 |
| 2,078,479 | Briggs | Apr. 27, 1937 |
| 2,147,422 | Bendz | Feb. 14, 1939 |
| 2,202,197 | Ewertz | May 28, 1940 |
| 2,261,495 | Ewertz | Nov. 4, 1941 |
| 2,297,680 | Alling | Oct. 6, 1942 |
| 2,388,812 | Albin | Nov. 13, 1945 |
| 2,419,601 | Silver | Apr. 29, 1947 |
| 2,446,719 | Ray | Aug. 10, 1948 |

FOREIGN PATENTS

| Number | Country | Date |
| --- | --- | --- |
| 479,258 | Germany | 1929 |